United States Patent
Roeck

(10) Patent No.: US 11,166,113 B2
(45) Date of Patent: Nov. 2, 2021

(54) METHOD FOR OPERATING A HEARING SYSTEM AND HEARING SYSTEM COMPRISING TWO HEARING DEVICES

(71) Applicant: Sonova AG, Staefa (CH)

(72) Inventor: Hans-Ueli Roeck, Hombrechtikon (CH)

(73) Assignee: Sonova AG, Staefa (CH)

( * ) Notice: Subject to any disclaimer, the term of this patent is extended or adjusted under 35 U.S.C. 154(b) by 54 days.

(21) Appl. No.: 16/572,646

(22) Filed: Sep. 17, 2019

(65) Prior Publication Data

US 2020/0092665 A1 Mar. 19, 2020

(30) Foreign Application Priority Data

Sep. 18, 2018 (EP) ..................................... 18195269

(51) Int. Cl.
*H04R 25/00* (2006.01)
*H04M 1/72478* (2021.01)

(52) U.S. Cl.
CPC ...... *H04R 25/603* (2019.05); *H04M 1/72478* (2021.01); *H04R 25/558* (2013.01); *H04R 25/604* (2013.01); *H04R 2225/55* (2013.01)

(58) Field of Classification Search
CPC .......................... H04R 25/552; H04R 25/554; H04R 2225/61; H04R 25/407; H04R 2225/41; H04R 25/505; H04R 25/558; H04R 2225/55; H04R 2225/43; H04R 2430/01; H04R 2420/07; H04R 25/70; H04R 1/1041; H04R 2225/39; H04R 25/405
See application file for complete search history.

(56) References Cited

U.S. PATENT DOCUMENTS

| | | | | |
|---|---|---|---|---|
| 2008/0144867 | A1* | 6/2008 | Schulz ................. | H04R 25/552 381/314 |
| 2008/0167092 | A1* | 7/2008 | Ueda ................... | H04M 1/6066 455/575.2 |
| 2009/0296951 | A1 | 12/2009 | De Haan | |
| 2010/0002887 | A1* | 1/2010 | Roeck .................. | H04R 25/552 381/23.1 |
| 2010/0054518 | A1 | 3/2010 | Goldin | |
| 2010/0202626 | A1* | 8/2010 | Shiori ..................... | G06F 3/017 381/74 |
| 2011/0293102 | A1* | 12/2011 | Kitazawa .............. | G06F 3/0433 381/56 |

(Continued)

FOREIGN PATENT DOCUMENTS

| | | |
|---|---|---|
| EP | 1933593 A2 | 6/2008 |
| EP | 2428869 A1 | 3/2012 |

(Continued)

OTHER PUBLICATIONS

European Patent Office, extended European Search Report for EP18195269, dated Mar. 4, 2019, Munich, Germany.

*Primary Examiner* — Alexander Krzystan
*Assistant Examiner* — Julie X Dang
(74) *Attorney, Agent, or Firm* — ALG Intellectual Property, LLC

(57) ABSTRACT

The disclosure relates to a method of operating a hearing system comprising a first hearing device configured to be worn at a first ear of a user, and a second hearing device configured to be worn at a second ear of the user. The disclosure further relates to a hearing system and a hearing device of the hearing system.

20 Claims, 4 Drawing Sheets

(56) References Cited

U.S. PATENT DOCUMENTS

| | | | |
|---|---|---|---|
| 2013/0022214 A1* | 1/2013 | Dickins | G06F 3/043 |
| | | | 381/74 |
| 2015/0036835 A1 | 2/2015 | Chen | |
| 2017/0199643 A1* | 7/2017 | Schnyder | G06F 3/0488 |
| 2017/0374477 A1 | 12/2017 | Salvatucci et al. | |
| 2018/0242069 A1* | 8/2018 | Hviid | H04R 1/1041 |
| 2019/0289409 A1* | 9/2019 | Greenberg | H04R 25/558 |

FOREIGN PATENT DOCUMENTS

| | | |
|---|---|---|
| WO | 2009/144332 A3 | 12/2009 |
| WO | 2007/049254 A9 | 5/2017 |

\* cited by examiner

METHOD FOR OPERATING A HEARING SYSTEM AND HEARING SYSTEM COMPRISING TWO HEARING DEVICES

TECHNICAL FIELD

This disclosed technology generally relates to method of operating a hearing system comprising two hearing devices, and more specifically to a control of an operation of the hearing system and/or of a device operatively connected to the hearing system based on a manual user interaction.

BACKGROUND

Hearing devices are often employed in conjunction with communication devices, such as smartphones, for instance when listening to sound data processed by the communication device and/or during a phone conversation operated by the communication device. More recently, communication devices have been integrated with hearing devices such that the hearing devices at least partially comprise the functionality of those communication devices. Hearing systems often comprise two hearing devices configured to be worn at both ears of a user, for instance to provide a stereo sound and/or to compensate for a hearing loss in the ears. Hearing systems comprising two hearing devices are sometimes referred to as binaural hearing systems.

When a hearing device is positioned at the intended wearing position at the ear of a user, for instance completely or partially inside an ear canal of the ear and/or at a concha of the ear and/or behind the ear, the user sometimes desires to influence an operation of the device. The operation may include to raise or lower a volume to a satisfactory level, switching to another hearing program, and/or accepting or declining a phone call. The desired operation may be executed directly by the respective hearing device or by a device operatively connected to the hearing device such as, for instance, a smartphone, a tablet, a computer, a television set, or the like. Some examples of prior art solutions for a user interface allowing a manual user interaction for controlling such an operation include pushbuttons, rotary switches, toggle switches, or touchpads at an outer surface of the device. A manipulation of those control elements by the user, however, often poses problems inherently connected with a comparatively small size of the control element limited by the device size and/or the wearing position of the device at the ear not allowing a visual inspection of the device during the manipulation. Other prior art solutions employ an accelerometer provided in the hearing device as a user interface. The accelerometer may be employed to detect a manual user interaction, for instance by detecting an acceleration of the hearing device caused by a manual impact on the hearing device or on the ear at the wearing position. The accelerometer may also be used to detect a user interaction based on another specific movement or movement pattern of the hearing device at the wearing position, for instance a movement caused by shaking or nodding of the user's head. Such a movement based user interaction, however, can rather easily provoke false activations of the operation by an accidental or inaccurate execution of the movement by the user, especially when a plurality of movement patterns are associated with different operations.

International patent application No. WO 2015/180796 A1 discloses a hearing device in which two microphones are provided with a respective sound inlet at the device housing which allows a detection of a manual user interaction based on touch gestures at the housing such as swiping a finger in between the sound inlets or tapping a finger on the housing. Such a user interface can facilitate the manipulation of a device operation on the device, since a tapping at any position on the device housing and/or a tapping on the ear at which the device is worn, may already be sufficient to initialize a desired operation.

SUMMARY

It is an object of the present disclosure to avoid at least one of the above-mentioned disadvantages when operating a hearing system comprising two hearing devices, by enabling a user interaction that can be easily memorized and/or reproduced by the user. It is another object to provide a hearing system with the capability of supporting many different user interactions, by ensuring a high reliability and/or low error rate for distinguishing in between the user interactions. It is yet another object to allow a user-friendly choice in between at least two different operation options of the hearing system and/or of a device operatively connected to the hearing system. It is a further object to provide a rather uncomplicated possibility for the user to accept and/or decline a phone call by the hearing system. At least one of these objects can be achieved by the appended claims.

Accordingly, the present disclosure proposes a method of operating a hearing system comprising a first hearing device configured to be worn at a first ear of a user and a second hearing device configured to be worn at a second ear of the user. The method comprises outputting an announcement signal by the first hearing device or by the second hearing device. The method further comprises detecting a manual user interaction by at least one of the first hearing device and the second hearing device. The method further comprises controlling an operation of at least one of the hearing system and a device operatively connected to the hearing system depending on which hearing device has outputted the announcement signal, and depending on whether a manual user interaction following the announcement signal was detected by the first hearing device or by the second hearing device. In this way, a rather simple and nevertheless reliable control of an operation of the hearing system can be provided.

A hearing system according to the present disclosure comprises a first hearing device configured to be worn at a first ear of a user, and a second hearing device configured to be worn at a second ear of the user. Each hearing device comprises a user interface configured to detect a manual user interaction and an output transducer configured to output an announcement signal. The hearing system further comprises a processor configured to initiate outputting of the announcement signal by the output transducer of the first hearing device or the second hearing device. Furthermore, the processor is configured to provide a control signal for controlling an operation of at least one of the hearing system and a device operatively connected to the hearing system depending on which hearing device has outputted the announcement signal, and depending on whether a manual user interaction following the announcement signal was detected by the user interface of the first hearing device or by the user interface of the second hearing device.

The present disclosure also relates to a hearing device configured as the first hearing device or the second hearing device of the hearing system. Features regarding some implementations of the hearing system and/or the hearing device, as further detailed in the subsequent description, may be correspondingly applied in some implementations of the method of operating a hearing system. Aspects regarding some implementations of the method of operating a hearing system, as further detailed in the subsequent description, may be correspondingly applied in some implementations of the hearing system and/or hearing device.

In some implementations, said controlling an operation comprises controlling a first operation depending on whether a manual user interaction was detected by the first hearing device and controlling a second operation depending on whether a manual user interaction was detected by the second hearing device. Correspondingly, the processor may be configured to provide a first control signal for controlling a first operation depending on a manual user interaction detected by the user interface of the first hearing device and to provide a second control signal for controlling a second operation depending on a manual user interaction detected by the user interface of the second hearing device.

In some implementations, the announcement signal is outputted after receiving of a communication signal. The communication signal can comprise a phone call signal. The phone call signal may be defined as a signal indicating an incoming phone call. The communication signal can comprise an indication signal. The indication signal may indicate an event, for instance an event scheduled by the user in a data base, an agenda, or the like. The indication signal may indicate a status, for instance a status of the hearing system and/or a device operatively connected to the hearing system, such as a battery status of the system and/or device. Correspondingly, the processor can be configured to receive a communication signal and to initiate the outputting of the announcement signal depending on receiving the communication signal. In some implementations, the hearing system comprises a receiving transducer configured to receive the communication signal, a communication signal transmitted via electromagnetic radiation. The receiving transducer may be configured to provide the communication signal to the processor, as an electric signal.

In some implementations, the announcement signal comprises a sound outputted by the respective hearing device. The output transducer of the hearing device can be an acoustic transducer configured to output a sound, to generate the sound from an electric audio signal. The sound may comprise at least one of an indication sound, a tone and/or vibration and/or tune and/or music and/or alarm sound, and a voice sound, a voice expressing a message to the user. In some implementations, the sound comprises a sound indicative for a phone call, a ring tone. In some implementations, the announcement signal comprises a tactile output. The tactile output may comprise an output perceptible at the skin of a user, such as a vibration of the respective hearing device. The output transducer of the hearing device can be configured to generate the vibration. In some implementations, the announcement signal comprises an electric signal. The output transducer of the hearing device can be configured to output the electric signal. The electric signal may be a signal transmitted to an electrode, e.g. of a cochlear implant.

In some implementations, the operation comprises at least one of accepting a phone call and declining a phone call. In some implementations, said controlling an operation comprises controlling a first operation and controlling a second operation. The processor can be configured to provide a first control signal for controlling the first operation and a second control signal for controlling the second operation. In some implementations, the first operation comprises accepting a process, a process to be executed by the hearing system and/or a device operatively connected to the hearing system, and the second operation comprises declining the process.

The operation of accepting the process may be controlled when a manual user interaction following the announcement signal was detected by the hearing device which has outputted the announcement signal. In this way, a positive feedback of the user corresponding to accepting the process can be mapped to this hearing device. The operation of declining the process may be controlled when a manual user interaction following the announcement signal was detected by the hearing device which has not outputted the announcement signal. In this way, a negative feedback of the user corresponding to declining the process can be mapped to this other hearing device. One of the first operation and the second operation can comprise accepting a phone call and the other of the first operation and the second operation can comprise declining a phone call.

In some implementations, the hearing system further comprises a sending transducer configured to send the control signal provided by the processor, to a device operatively connected to the hearing system. The processor can be configured to provide the control signal as an electric control signal and the sending transducer can be configured to convert the electric control signal into electromagnetic radiation. The sending transducer can be configured to convert the electric control signal into a short-range radio signal. The short-range radio signal can comprise a signal operating according to the Bluetooth™ protocol.

In some implementations, the method comprises detecting a manual user interaction by at least one of the first hearing device and the second hearing device within a predetermined time window after outputting the announcement signal, and controlling an operation depending on whether a manual user interaction following the announcement signal was detected by the first hearing device or by the second hearing device within the predetermined time window. The processor can be configured to apply a predetermined time window for detecting the manual user interaction after outputting of the announcement signal, wherein the processor can be configured to control the operation depending on whether the manual user interaction was detected within the time window.

In some implementations, the manual user interaction comprises at least one of touching the respective hearing device, a user interface and/or a housing of the respective hearing device, and touching an ear of the user at which the respective hearing device is worn. The processor can be configured to provide a different control signal depending on whether a user interaction of touching the respective hearing device or a user interaction of touching an ear following the announcement signal was detected. In some implementations, the manual user interaction comprises touching a housing of the respective hearing device, wherein the user interface is configured to distinguish between at least two different portions of the housing at which said manual user interaction has been detected. The processor can be configured to provide a different control signal depending on which portion of the housing the manual user interaction following the announcement signal was detected. The different portions of the housing may include at least two separate areas of a surface of the housing.

In some implementations, the user interface comprises at least one detector for the manual user interaction, in particular at least one of a push button, a touch sensor, a radar sensor, an accelerometer, and a microphone configured to detect the manual user interaction. In some implementations, the user interface comprises at least two detectors for the manual user interaction, an accelerometer and at least one of a push button, a touch sensor, and a microphone. The processor can be configured to provide a control signal depending on a detection of said manual user interaction by the at least two detectors, the accelerometer and at least one of the push button, the touch sensor, and the microphone. The processor can be configured to provide a control signal for controlling a first operation depending on a detection of said manual user interaction by one detector, and to provide a control signal for controlling a second operation depending on a detection of said manual user interaction by another detector. The processor can be configured to provide a control signal for controlling a first operation depending on a detection of said manual user interaction by the accelerometer, and to provide a control signal for controlling a second operation depending on a detection of said manual user interaction by at least one of a push button, a touch sensor, and a microphone. Different operations can thus be associated with different detectors. In this way, multiple detectors can be used in way in which they do not interfere with each other when controlling different operations. A detector associated with an operation and/or a control signal of the operation and/or the operation itself can be disabled during a time in which another detector associated with another operation is operable to detect the user interaction. Such a disabled detector would only get enabled during a certain event, e.g. a phone ring tone, a battery low warning, etc., and for some time thereafter. Thus, using a first enabled detector may not interfere with a usually disabled second detector and thus may not trigger false detection events. As an example, a tap sensor in an accelerometer may not generate false tap events while the user tries to use the volume control buttons.

In some implementations, said outputting an announcement signal by the first hearing device or by the second hearing device comprises outputting the announcement signal predominantly by one of the first hearing device and the second hearing device. The processor can be configured to initiate outputting the announcement signal predominantly by one of the first hearing device and the second hearing device. In some implementations, said outputting an announcement signal by the first hearing device or by the second hearing device comprises outputting the announcement signal in a more perceptible way by one of the first hearing device and the second hearing device and/or in a less perceptible way by the other of the first hearing device and the second hearing device. The processor can be configured to initiate outputting the announcement signal by one of the first hearing device and the second hearing device in a more perceptible way and/or by the other of the first hearing device and the second hearing device in a less perceptible way. The announcement signal can be output at a larger volume by one of the first hearing device and the second hearing device and/or at a smaller volume by the other of the first hearing device and the second hearing device.

In some implementations, said outputting an announcement signal by the first hearing device or by the second hearing device comprises outputting the announcement signal by one of the first hearing device and the second hearing device and not by the other of the first hearing device and the second hearing device. The processor can be configured to initiate outputting the announcement signal by one of the first hearing device and the second hearing device and not by the other of the first hearing device and the second hearing device. In some implementations, said outputting an announcement signal comprises outputting an announcement signal exclusively by the first hearing device or by the second hearing device. The processor can be configured to initiate outputting the announcement signal by the output transducer exclusively of the first hearing device or the second hearing device. In some implementations, the method comprises outputting the announcement signal by the first hearing device and not by the second hearing device, and controlling the operation depending on at least on whether the manual user interaction was detected by the first hearing device and whether the manual user interaction was detected by the second hearing device. The processor can be configured to initiate outputting the announcement signal by the first hearing device and not by the second hearing device, and to provide the control signal depending on at least one of whether the manual user interaction was detected by the user interface of the first hearing device and whether the manual user interaction was detected by the user interface of the second hearing device.

BRIEF DESCRIPTION OF THE DRAWINGS

Reference will now be made in detail to embodiments, examples of which are illustrated in the accompanying drawings. In the drawings.

DETAILED DESCRIPTION OF THE DRAWINGS

In the following detailed description, numerous specific details are set forth in order to provide a thorough understanding of the subject matter herein. However, it will be apparent to one of ordinary skill in the art that the subject matter may be practiced without these specific details. In other instances, well known methods, techniques, procedures, processes, algorithms, components, circuits, structures and systems have not been described in detail so as not to unnecessarily obscure features of the embodiments. In the following description, features of one embodiment may be used in combination with features from another embodiment where the features of the different embodiment are not incompatible. The ensuing description provides some embodiment(s) of the disclosed technology, and is not intended to limit the scope, applicability or configuration of the disclosed technology. Various changes may be made in the function and arrangement of elements without departing from the scope of the disclosed technology as set forth herein.

Figure 1:
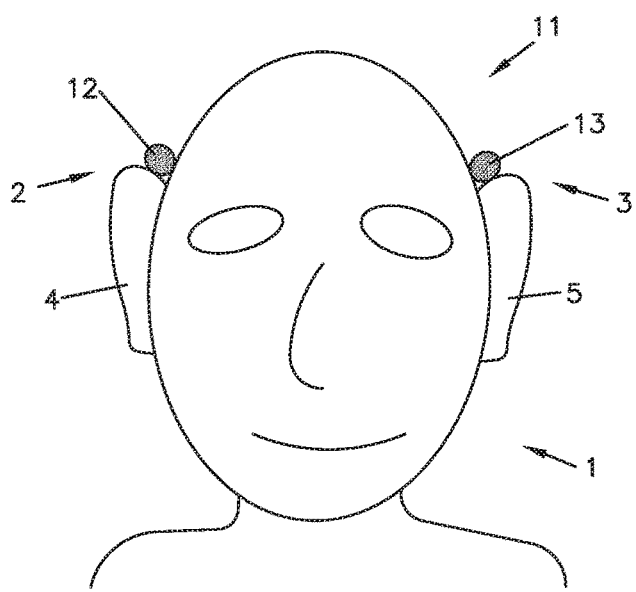
FIG. 1 schematically illustrates a hearing system comprising two hearing devices worn on a respective wearing position at opposite ears of a user, in accordance with some embodiments of the present disclosure.

FIG. 1 schematically illustrates a hearing system 11 worn by a user 1, in accordance with some embodiments of the present disclosure. Hearing system 11 is a binaural hearing system comprising two hearing devices 12, 13. Hearing devices 12, 13 are each configured to be worn at a respective wearing position 2, 3. Wearing positions 2, 3 are located at opposite ears 4, 5 of user 1. For instance, wearing positions 2, 3 can include a position in which hearing devices 12, 13 are at least partially inserted inside an ear canal of ears 4, 5, a position in which hearing devices 12, 13 are at least partially disposed behind ears 4, 5, a position in which hearing devices 12, 13 are at least partially disposed at a pinna, in particular a concha, of ears 4, 5, a position in which hearing devices 12, 13 are at least partially disposed in a vicinity of ears 4, 5, and a combination of at least two of these positions. First hearing device 12 is worn at first wearing position 2 at first ear 4. Second hearing device 13 is worn at second wearing position 3 at second ear 5. In some examples of applying hearing system 11, as depicted in FIG. 1, first wearing position 2 of first hearing device 12 can be located at the right ear 4 and second wearing position 3 of second hearing device 13 can be located at the left ear 5 of user 1. In some other examples of applying hearing system 11, first wearing position 2 of first hearing device 12 can be located at left ear 5 and second wearing position 3 of second hearing device 13 can be located at right ear 4 of user 1. In some configurations of hearing system 11, first hearing device 12 and/or second hearing device 13 is configured to be worn at both right ear 4 and left ear 5. In some other configurations of hearing system 11, one of first hearing device 12 and second hearing device 13 is configured to be worn at one of right ear 4 and left ear 5 and the other of first hearing devices 12 and second hearing device 13 is configured to be worn at the other of right ear 4 and left ear 5. In some implementations, hearing devices 12, 13 may be provided as earphones, earplugs, earbuds, or the like. In some implementations, hearing devices 12, 13 may be provided as a hearing instrument, for instance a receiver-in-the-canal (RIC) hearing aid or a behind-the-ear (BTE) hearing aid or an in-the-ear (ITE) hearing aid or a cochlear implant.

Figure 2:
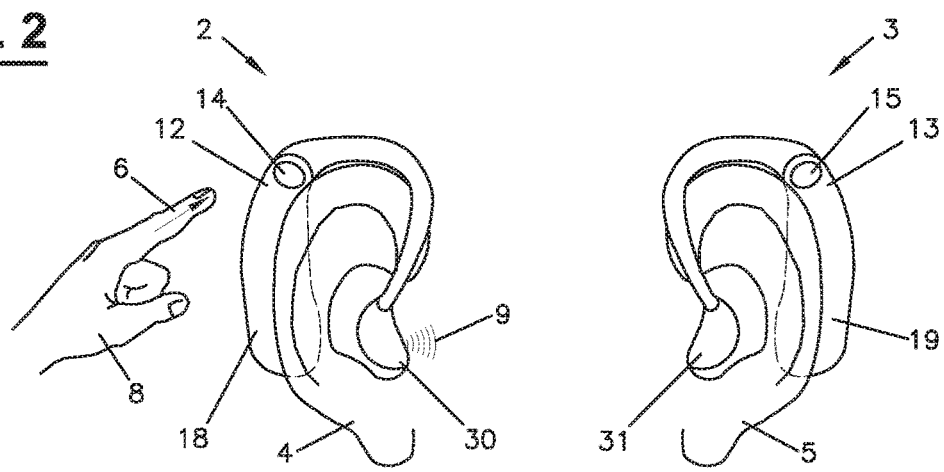
FIG. 2 schematically illustrates a hearing system and manual gestures in accordance with some embodiments of the present disclosure.
Figure 3:
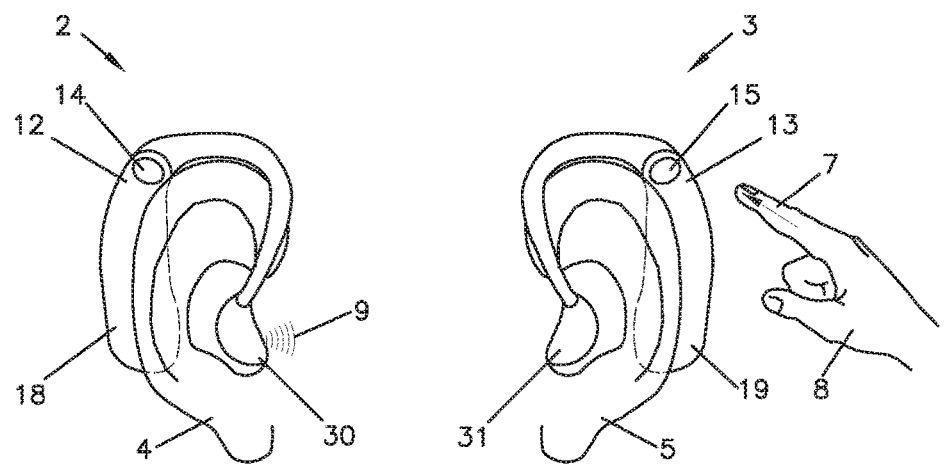
FIG. 3 schematically illustrates the hearing system depicted in FIG. 2 and other manual gestures at a wearing position, in accordance with some embodiments of the present disclosure.

FIGS. 2 and 3 schematically illustrate hearing system 11 in greater detail, in accordance with some embodiments of the present disclosure. Each hearing device 12, 13 comprises a housing 18, 19 configured to be worn at respective wearing position 2, 3. Hearing system 11 further comprises two user interfaces 14, 15. First user interface 14 is included in first hearing device 12. Second user interface 15 is included in second hearing device 13. User interfaces 14, 15 are configured to detect a manual user interaction. The manual user interaction at the respective wearing position 2, 3 is schematically indicated in FIGS. 2 and 3 by an arrow 6, 7. In some implementations, manual user interaction 6, 7 can comprise a movement of at least one hand 8, the left hand and/or the right hand of user 1, in a proximity to at least one of hearing devices 12, 13. In some implementations, manual user interaction 6, 7 can comprise a touch gesture. The touch gesture may comprise touching at least one user interface 14, 15 and/or at least one housing 18, 19 and/or at least one hearing device 12, 13 and/or at least one ear 4, 5 and/or at least one portion of the user's head close to ear 4, 5. User interfaces 14, 15 are configured to provide a respective detection signal after detection of a manual user interaction 6, 7 by the respective user interface 14, 15. At least one manual user interaction 6, 7 is associated with an operation to be executed by hearing system 11 and/or by a device operatively connected to hearing system 11. In some implementations, one of manual user interactions 6, 7 is associated with a first operation and the other of manual user interactions 6, 7 is associated with a second operation.

Each user interface 14, 15 comprises at least one sensor sensitive to manual user interaction 6, 7, user interface 14, 15 may comprise a tactile sensor configured to detect touching of hearing device 12, 13, touching of user interface 14, 15 and/or touching of housing 18, 19. The tactile sensor may comprise at least one of a push button, a touch sensor, and a microphone. The tactile sensor may be at least partially provided outside of housing 18, 19, at an outer surface of housing 18, 19. User interface 14, 15 may comprise an accelerometer configured to detect an acceleration of hearing device 12, 13 caused by manual user interaction 6, 7. For instance, the acceleration may be caused by a touch gesture, touching of hearing device 12, 13 and/or touching of ear 4, 5 at which hearing device 12, 13 is worn. The accelerometer may be provided inside and/or outside housing 18, 19. User interface 14, 15 may comprise a radar sensor configured to detect manual user interaction 6, 7, a movement and/or a touch gesture of hand 8. In some implementations, user interface 14, 15 comprises at least two sensors sensitive to manual user interaction 6, 7. Manual user interaction 6, 7 may then be detected by evaluating a combination of sensing data obtained by the two sensors. User interface 14, 15 may comprise a tactile sensor, such as a microphone, and an accelerometer to combine tactile sensing information with acceleration sensing information.

In some implementations, user interface 14, 15 is configured to distinguish between at least two different manual user interactions 6, 7, in particular at the same wearing position 2, 3. The different manual user interactions 6, 7 can comprise touch gestures at different locations at wearing position 2, 3. In some implementations, the different manual user interactions 6, 7 can comprise touching ear 4, 5 and touching hearing device 12, 13, in particular user interface 14, 15 and/or housing 18, 19. The touching of hearing device 12, 13 may be determined by a tactile sensor and/or an accelerometer and/or a radar sensor. The touching of ear 4, 5 may be determined by an accelerometer and/or a radar sensor. In some implementations, the different manual user interactions 6, 7 can comprise touching of different portions of housing 18, 19. The touching of different portions of housing 18, 19 may be determined by a plurality of tactile sensors provided at the respective portion of housing 18, 19. For instance, the different portions of housing 18, 19 may comprise at least two of a front side portion, a back side portion, a bottom side portion, and a top side portion of housing 18, 19. User interface 14, 15 is configured to provide a respective detection signal after detection of each different manual user interaction 6, 7. In some implementations, at least two different manual user interactions 6, 7 at the same wearing position 2, 3 are each associated with an operation to be executed by hearing system 11 and/or a device operatively connected to hearing system 11.

At least one hearing device 12, 13 is configured to output an announcement signal. In some implementations, first hearing device 12 and second hearing device 13 are each configured to output an announcement signal. The announcement signal may be output by an output transducer 30, 31 included in the respective hearing device 12, 13. The announcement signal is adapted to attract the attention of user 1. The announcement signal can comprise a sound, for instance a tone and/or tune and/or music and/or alarm and/or voice sound. The announcement signal can comprise a vibration of hearing device 12, 13 adapted to be perceptible by user 1. The announcement signal can comprise an electric signal transmitted to an output electrode, for instance an electrode of a cochlear implant. An announcement signal 9 including a sound is schematically indicated in FIGS. 2 and 3.

Hearing system 11 is configured to initiate outputting of announcement signal 9 exclusively by output transducer 30 of first hearing device 12 or by output transducer 31 of second hearing device 13. In some implementations of operating hearing system 11, as depicted in FIGS. 2 and 3, announcement signal 9 is output by first output transducer 30 of first hearing device 12 and not by second output transducer 31 of second hearing device 13. Manual user interaction 6, as depicted in FIG. 2, is applied at wearing position 2 of hearing device 12 outputting announcement signal 9. Manual user interaction 7, as depicted in FIG. 3, is applied at wearing position 3 of hearing device 13 not outputting announcement signal 9. Hearing system 11 is configured to control an operation of hearing system 1 and/or a device operatively connected to hearing system 11 depending on whether manual user interaction 6, 7 was detected by hearing device 12 outputting announcement signal 9 or by hearing device 13 not outputting announcement signal 9. In some implementations, hearing system 11 is configured to control a first operation depending on whether manual user interaction 6 was detected by hearing device 12 outputting announcement signal 9 and a second operation depending on whether manual user interaction 7 was detected by hearing device 13 not outputting announcement signal 9.

Figure 4:
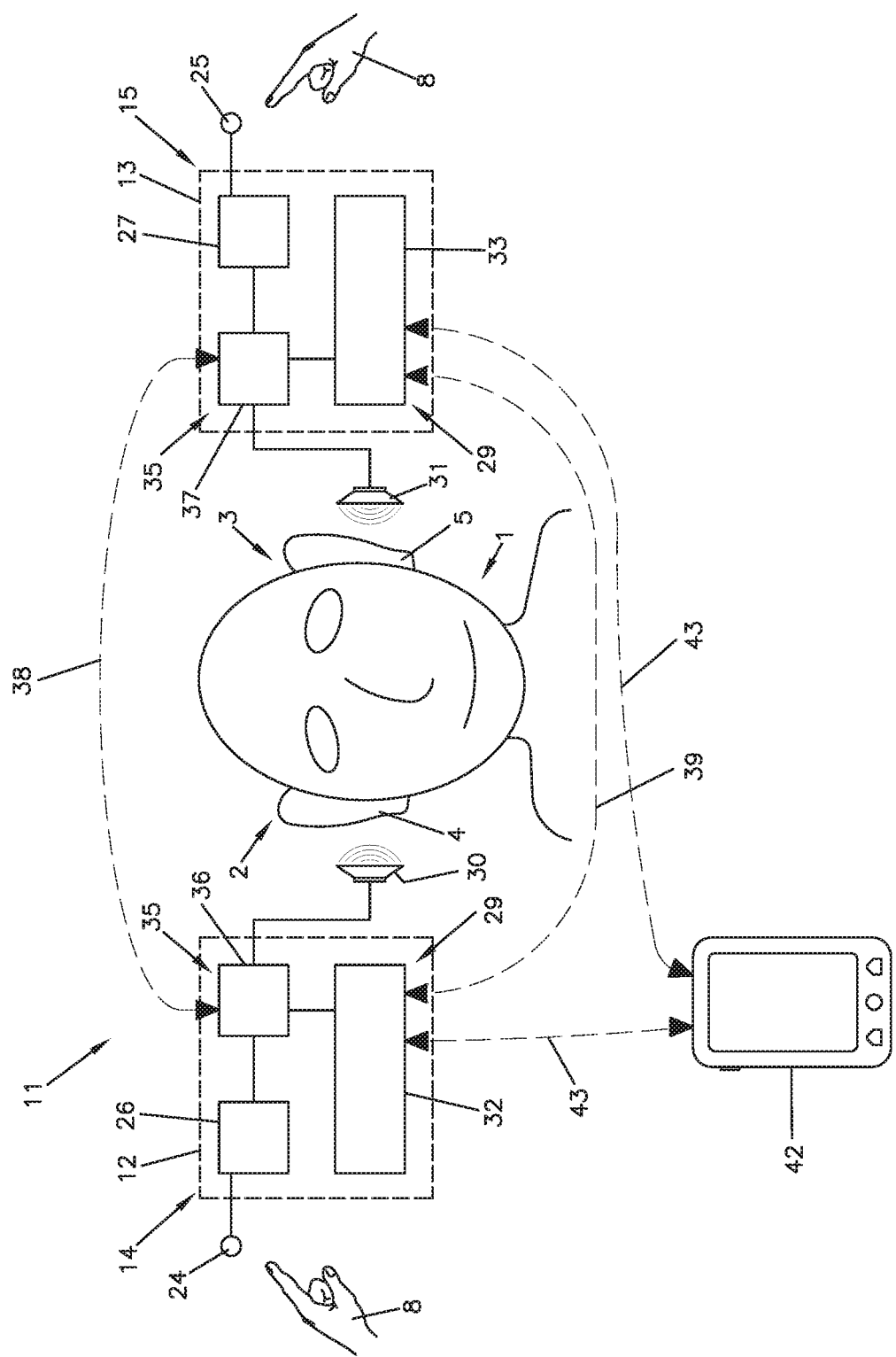
FIG. 4 schematically illustrates a hearing system by means of a block diagram, in accordance with some embodiments of the present disclosure.

FIG. 4 illustrates a block diagram of hearing system 11, in accordance with some embodiments of the present disclosure. First user interface 14 of first hearing device 12 comprises a first sensor 24 sensitive to manual user interactions and a first detection unit 26 operatively connected to first sensor 24. Second user interface 15 of second hearing device 13 comprises second sensor 25 sensitive to manual user interactions and a second detection unit 27 operatively connected to second sensor 25. Each detection unit 26, 27 is configured to provide a detection signal after sensing of a manual user interaction by the operatively connected sensor 24, 25. First hearing device 12 comprises first output transducer 30. Second hearing device 13 comprises second output transducer 31. Each output transducer 30, 31 is configured to output the announcement signal. In some implementations, as illustrated in FIG. 4, output transducer 30, 31 is an acoustic transducer, a loudspeaker, and/or a receiver, configured to output sound directed to ear 4, 5 at wearing position 2, 3.

Hearing system 11 further comprises a sending and receiving transducer 29 provided by a transceiver. Hearing system 11 is operatively connected to a communication device 42 via the transceiver 29. Communication device 42 may be a mobile phone, a smartphone, a sound data processor comprising a transceiver, a microphone as part of an at least partially acoustic transceiver, a transceiver of another hearing instrument and/or the like. Transceiver 29 is configured to receive a signal from communication device 42 via a signal line 43. Transceiver 29 is also configured to send a signal to communication device 42 via signal line 43. Signal line 43 may be wired and/or wireless. In some implementations, transceiver 29 is configured to send and/or receive the signal via electromagnetic radiation. The signal may be transmitted between transceiver 29 and communication device 42 as a short-range radio signal, for instance in accordance with the Bluetooth™ protocol. Transceiver 29 comprises a first transducer unit 32 included in first hearing device 12 and a second transducer unit 33 included in second hearing device 13. First transducer unit 32 and second transducer unit 33 are operatively connected via a signal line 39. Signal line 39 may be a wired and/or wireless signal line.

In some implementations, the signal received by transceiver 29 via signal line 43 comprises a communication signal. The communication signal may comprise a radio program, a sound content played by a sound data processor, a voice and/or ambient sound detected by a microphone of a hearing instrument, a telephone call signal, a telephone conversation signal and/or the like. Transceiver 29 is configured to provide an electric signal from the received communication signal. In some implementations, the signal sent by transceiver 29 via signal line 43 comprises a control signal. The control signal may be suitable for controlling at least one operation of communication device 42 operatively connected to hearing system 11.

Hearing system 11 further comprises a processor 35. Processor 35 is operatively connected to transceiver 29. Processor 35 is configured to receive the electric signal provided by transceiver 29 from a signal received from communication device 42. Processor 35 is also configured to provide a control signal to communication device 42 via transceiver 29. Processor 35 is operatively connected to first user interface 14 of first hearing device 12 and to second user interface 15 of second hearing device 13. Processor 35 is configured to receive the detection signal provided by the respective detection unit 26, 27 after sensing of a manual user interaction by the respective sensor 24, 25. Processor 35 is operatively connected to first output transducer 30 of first hearing device 12 and to second output transducer 31 of second hearing device 13. Processor 35 is configured to initiate outputting of the announcement signal by the respective output transducer 30, 31. Processor 35 comprises a first processor part 36 included in first hearing device 12 and a second processor part 37 included in second hearing device 13. First processor part 36 and second processor part 37 are operatively connected, for instance via a wired and/or wireless signal line 38. In some implementations, the processor 35 can carry out all operations to perform an operation.

The processor 35 can generate a control signal that can control the operation of the hearing devices or hearing devices or transmit a control signal to another device (e.g., mobile phone or computer), wherein the control signal can cause a hearing device or device to perform the operation. For example, accept or reject a phone call by transmitting control signals to a device and/or generating control signals to control the operation of the hearing device).

Processor 35 comprises an operation configuration including two operational steps. At a first operational step, processor 35 is configured to initiate outputting of the announcement signal by one of the output transducers 30, 31. At a second operational step, processor 35 is configured to provide the control signal to communication device 42 depending on which hearing device 12, 13 has outputted the announcement signal, and whether a manual user interaction following the announcement signal was detected by user interface 14 of first hearing device 12 or by user interface 15 of second hearing device 13. Processor 35 may be configured to initiate outputting of the announcement signal by first output transducer 30 and not by second output transducer 31, and to provide the control signal depending on whether the manual user interaction was detected by first user interface 14 or by second user interface 15. In some implementations, processor 35 is configured at the second operational step to provide a first control signal for controlling a first operation depending on a manual user interaction detected by first user interface 14 and to provide a second control signal for controlling a second operation depending on a manual user interaction detected by second user interface 15. In some implementations, processor 35 is configured to initiate outputting of the announcement signal by one of output transducers 30, 31 after receiving of a communication signal from communication device 42 via transceiver 29.

The communication signal may be a phone call signal. The announcement signal may be a ring tone indicating the phone call. The first operation may be accepting the phone call and the second operation may be declining the phone call. In a case in which a control signal for accepting the phone call has been sent to communication device 42 by processor 35 via transceiver 29, processor 35 may be configured to initiate outputting of a phone conversation signal received from communication device 42 by transceiver 29 to at least one of first output transducer 30 and second output transducer 31, in particular to both output transducers 30, 31. In some implementations, hearing system 11 further comprises a microphone allowing user 1 to participate in a phone conversation. A microphone can be implemented in at least one of hearing devices 12, 13. In a case in which a control signal for declining the phone call has been sent to communication device 42 by processor 35 via transceiver 29, a transmission of a phone conversation signal between communication device 42 and hearing system 11 may be prevented.

Figure 5:
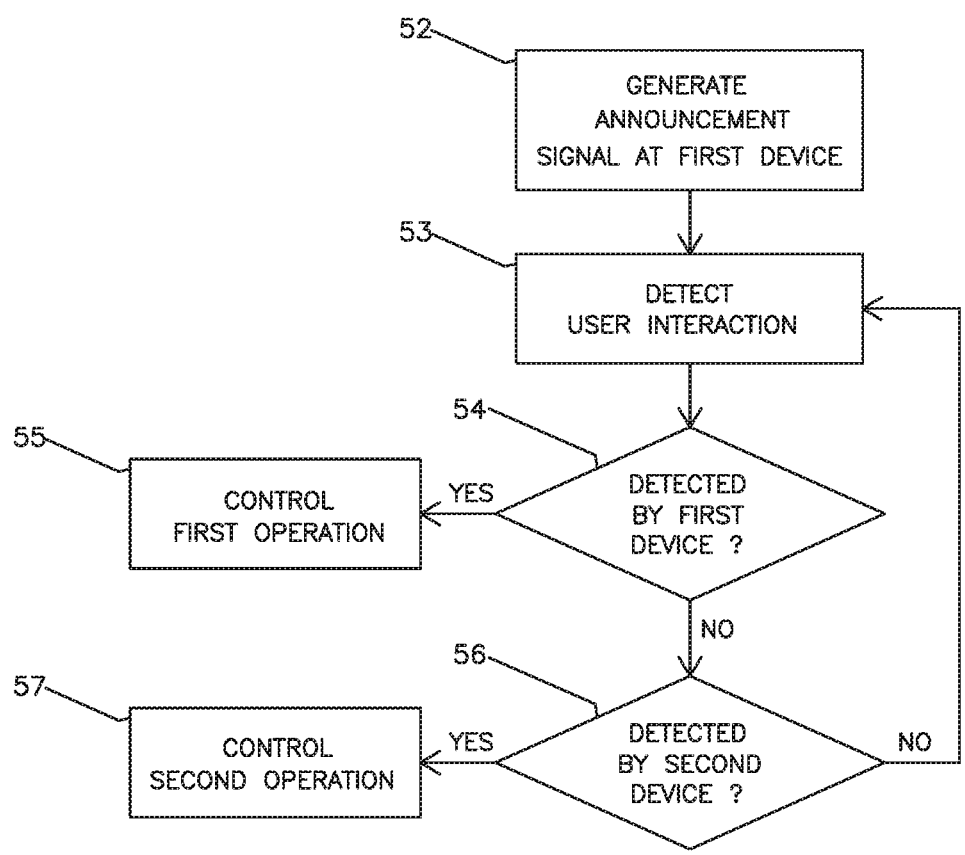
FIG. 5 illustrates a method of operating a hearing system comprising two hearing devices, in accordance with some embodiments of the present disclosure.
Figure 6:
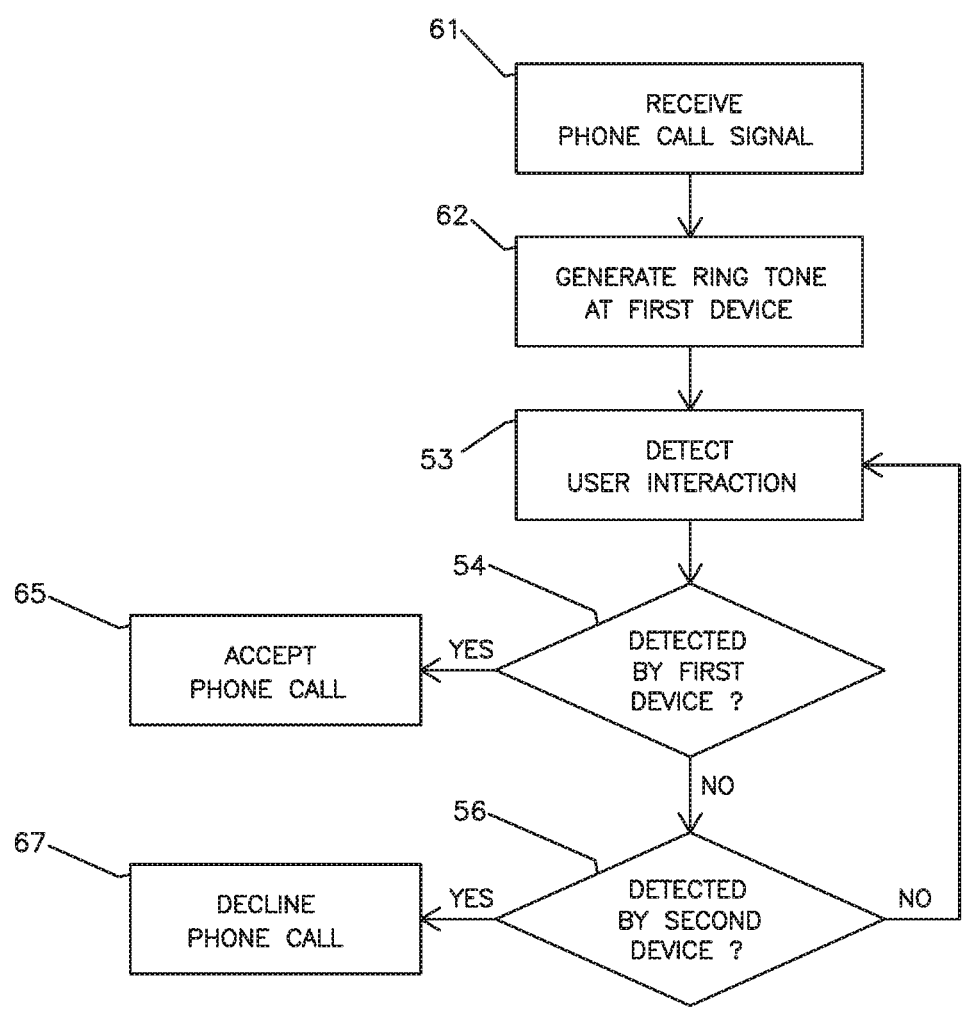
FIG. 6 illustrates a method of operating a hearing system comprising two hearing devices, in accordance with some embodiments of the present disclosure.

FIG. 5 and FIG. 6 illustrate a method of operating a hearing device in accordance with some embodiments of the present disclosure. For illustrative purposes, the methods will be subsequently described based on embodiments of hearing system 11 depicted in FIGS. 1-4. It will be apparent to a skilled person, however, that the method can also be executed in other embodiments of hearing systems comprising two hearing devices. In the method illustrated in FIG. 5, after outputting an announcement signal at 52 by one of the first hearing device 12 and the second hearing device 13, detecting of a user interaction at 53 is operated by both the first hearing device 12 and the second hearing device 13. Depending on whether a user interaction has been detected by the first hearing device 12 at 54 or by the second hearing device 13 at 56, a first operation is controlled at 55 or a second operation is controlled at 57. In the method illustrated in FIG. 6, after receiving a phone call signal at 61, a ring tone is outputted at 62 by one of the first hearing device 12 and the second hearing device 13. After detecting of user interaction at 53 operated at both the first hearing device 12 and the second hearing device 13 and depending on whether a user interaction has been detected by the first hearing device 12 at 54 or by the second hearing device 13 at 56, the phone call is accepted at 65 or the phone call is declined at 67.

While the principles of the disclosure have been described above in connection with specific systems, devices and methods, it is to be clearly understood that this description is made only by way of example and not as limitation on the scope of the disclosed technology. The above described preferred embodiments are intended to illustrate the principles of the invention, but not to limit the scope of the invention. Various other embodiments and modifications to those preferred embodiments may be made by those skilled in the art without departing from the scope of the present invention that is solely defined by the claims.

The invention claimed is:

1. A method of operating hearing devices, the method comprising:

providing an announcement signal at either a first hearing device or a second hearing device, the first hearing device and the second hearing device having a plurality of detectors configured to detect a manual user response;

disabling, by a processor associated with the first hearing device and the second hearing device and based on the announcement signal, one or more detectors included in the plurality of detectors;

detecting, by using at least one detector included in the plurality of detectors and that has not been disabled, the manual user response in response to the announcement signal at the first hearing device, at the second hearing device, or at both the first hearing device and the second hearing device;

in response to the detection of the manual user response, selecting an operation to perform based on whether the manual user response was detected at the first hearing device, at the second hearing device, or at both the first hearing device and the second hearing device; and generating a control signal for the first hearing device or the second hearing device or transmitting a control signal to a device operatively connected to the first hearing device or the second hearing device based on the selected operation, wherein the generated control signal causes the first hearing device or the second hearing device to perform the selected operation or the transmitted control signal causes the device to perform the selected operation.

2. The method according to claim 1, wherein the announcement signal is output after receiving of a communication signal.

3. The method according to claim 1, wherein the announcement signal comprises a sound output.

4. The method according to claim 1, wherein the operation comprises accepting a phone call or declining a phone call.

5. The method according to claim 1, wherein the detecting the manual user response is associated with detecting a tapping of the first hearing device or the second hearing device.

6. A hearing system comprising:

a first hearing device configured to be worn at a first ear of a user; and a second hearing device configured to be worn at a second ear of the user, wherein each hearing device comprises:

a user interface including a plurality of detectors configured to detect a manual user interaction;

an output transducer configured to provide audio information; and a processor configured to:

provide an announcement signal to the output transducer;

disable, based on the announcement signal, one or more of the detectors included in the plurality of detectors of at least one of the first hearing device or the second hearing device; and provide a control signal for controlling an operation of the hearing system or to transmit the control signal to a device operatively connected to the first hearing device or the second hearing device based on whether a manual user interaction following the announcement signal was detected by at least one detector included in the plurality of detectors of the first hearing device and that has not been disabled, by at least one detector included in the plurality of detectors of the second hearing device and that has not been disabled, or by at least some of the detectors included in the plurality of detectors of the first and second hearing devices and that have not been disabled.

7. The hearing system of claim 6, wherein the plurality of detectors for each hearing device comprise an accelerometer.

8. The hearing system of claim 6, wherein the processor is configured to provide the control signal as an electric control signal, wherein the hearing system further comprises a sending transducer configured to convert the control signal into electromagnetic radiation.

9. The hearing system of claim 8, wherein the sending transducer is configured to convert the control signal into a short-range radio signal.

10. The hearing system of claim 6, wherein the processor is configured to apply a predetermined time window for detecting of the manual user interaction after outputting of the announcement signal, wherein the processor is configured to control the operation depending on detecting the manual user interaction within the predetermined time window.

11. The hearing system of claim 6, wherein the manual user interaction comprises at least one of touching the first hearing device or the second hearing device.

12. The hearing system of claim 6, wherein the user interface is configured to detect touching of a housing of the first hearing device or the second hearing device, wherein the user interface is configured to distinguish between at least two different portions of the housing based on the detected touching.

13. The hearing system of claim 6, wherein the plurality of detectors comprise at least some of a push button, a touch sensor, a radar sensor, an accelerometer, and a microphone configured to detect manual user interaction.

14. The hearing system of claim 6, wherein the plurality of detectors comprise an accelerometer and at least one of a push button, a touch sensor, and a microphone configured to detect said manual user interaction.

15. A non-transitory computer-readable medium storing instructions, which when executed by a processor, cause a hearing device or hearing devices to perform operations, the operations comprising:

provide an announcement signal at either a first hearing device or a second hearing device, the first hearing device and the second hearing device having a plurality of detectors configured to detect a manual user response;

disable, based on the announcement signal, one or more of the detectors included in the plurality of detectors;

detect, by using at least one detector included in the plurality of detectors and that has not been disabled, the manual user response in response to the announcement signal at the first hearing device, at the second hearing device, or at both the first hearing device and the second hearing device;

in response to the detection of the manual user response, select an operation to perform based on whether the manual user response was detected at the first hearing device, at the second hearing device, or at both the first hearing device and the second hearing device; and generate a control signal for the first hearing device or the second hearing device or transmit a control signal to a device operatively connected to the first hearing device or the second hearing device based on the selected operation, wherein the generated control signal causes the first hearing device or the second hearing device to perform the selected operation or the transmitted control signal causes the device to perform the selected operation.

16. The non-transitory computer-readable medium of claim 15, wherein the announcement signal is output after receiving of a communication signal.

17. The non-transitory computer-readable medium of claim 15, wherein the announcement signal comprises a sound output.

18. The non-transitory computer-readable medium of claim 15, wherein the operation comprises accepting a phone call or declining a phone call.

19. The non-transitory computer-readable medium of claim 15, wherein the detecting the manual user response is associated with detecting a tapping of the first hearing device or the second hearing device.

20. The non-transitory computer-readable medium of claim 15, wherein the detecting the manual user response is associated with receiving an accelerometer signal.

* * * * *